Patented Apr. 30, 1940

2,198,806

UNITED STATES PATENT OFFICE 2,198,806

SULPHONIC DERIVATIVES OF AMIDES

Albert K. Epstein and Morris Katzman, Chicago, Ill., assignors to The Emulsol Corporation, Chicago, Ill.

No Drawing. Application August 3, 1938, Serial No. 222,779

13 Claims. (Cl. 260—401)

This invention relates to new chemical compounds in the form of sulphonic derivatives which are characterized by possessing interface modifying properties rendering the same highly useful for the purposes for which such agents are employed in the various arts.

At least most of the novel sulphonic compounds fall within the scope of the general formulae

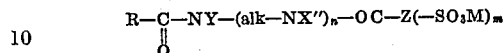

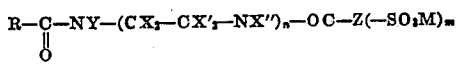

wherein

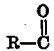

is an acyl radical containing at least four carbon atoms and particularly from twelve to eighteen carbon atoms, Y, X, X' and X'' are the same or dissimilar members selected from the group consisting of hydrogen, alkylol, alkyl, and cycloalkyl, alk is a hydrocarbon residue, saturated or unsaturated, with or without interruptions or substitutions, Z is a hydrocarbon residue, containing preferably less than six carbon atoms, M is a cation, $m$ is a whole number, preferably one or two, and $n$ is a whole number, preferably from one to four.

A more limited aspect of the compounds of the invention may be represented by the general formula

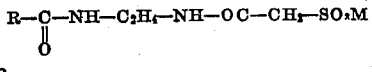

wherein

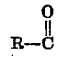

is an acyl radical containing at least eight and preferably from twelve to eighteen carbon atoms, and M is a cation.

The acyl radical

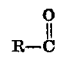

in the above formula may be of aliphatic cycloaliphatic, aromatic or aromatic-aliphatic character, as will be pointed out hereinafter, and may contain substituent groups such as amino, halogen, hydroxy, sulphate, sulphonic, phosphate, carboxyl, nitrile, and the like, but it is particularly preferred that it be unsubstituted aliphatic or fatty and contain from twelve carbon atoms to eighteen carbon atoms. Z and alk may also each contain substituent groups such as those mentioned and the sequence of carbon atoms therein may be interrupted by O, S, C=O, NH, NR where R is alkyl, and the like.

In order that the nature of the invention may become apparent, there are listed hereinbelow representative compounds which fall within the scope of the invention.

(1) $C_{11}H_{23}-\overset{O}{\underset{\|}{C}}-NH-CH_2-CH_2-NH-OC-CH_2-SO_3K$ (2) $C_{17}H_{35}-\overset{O}{\underset{\|}{C}}-NH-CH_2-CH_2-CH_2-NH-OC-CH_2-SO_3Na$ (3) $C_{13}H_{27}-\overset{O}{\underset{\|}{C}}-NH-\underset{\underset{CH_3}{|}}{CH}-CH_2-NH-OC-CH_2-SO_3K$ (4) $C_7H_{15}-\overset{O}{\underset{\|}{C}}-NH-CH_2-CH_2-NH-OC-(CH_2)_3-SO_3Na$ (5) $\text{C}_6\text{H}_{11}-\overset{O}{\underset{\|}{C}}-NH-CH_2-CH_2-NH-OC-CH_2-SO_3Na$ (6) $C_{11}H_{23}-\overset{O}{\underset{\|}{C}}-NH-C_2H_4-NH-C_2H_4-NH-OC-CH_2-SO_3K$ (7) $C_{15}H_{31}-\overset{O}{\underset{\|}{C}}-NH-CH_2-CH_2-NH-OC-CH_2-SO_2N\begin{smallmatrix}C_2H_4OH\\C_2H_4OH\\H\quad C_2H_4OH\end{smallmatrix}$ (8) $\begin{smallmatrix}H_2C-CH_2\\H_2C\quad\quad\quad\\H_2C-CH_2\end{smallmatrix}CH-\overset{O}{\underset{\|}{C}}-NH-CH_2-CH_2-NH-OC-CH_2-SO_3K$ (9) $C_{10}H_{21}-\overset{O}{\underset{\|}{C}}-\underset{\underset{CH_3}{|}}{N}-CH_2-CH_2-\underset{\underset{CH_3}{|}}{N}-OC-CH_2-SO_3K$

(10) $C_{10}H_{21}-\overset{O}{\underset{\|}{C}}-\underset{\underset{C_2H_5}{|}}{N}-CH_2-CH_2-NH-CH_2-CH_2-\underset{\underset{C_2H_5}{|}}{N}-OC-CH_2-SO_3K$

(11) $C_{11}H_{23}-\overset{O}{\underset{\|}{C}}-NH-CH_2-CH_2-NH-OC-\underset{\underset{}{}}{CH}-SO_3Na$
$C_{11}H_{23}-\overset{O}{\underset{\|}{C}}-NH-CH_2-CH_2-NH-OC-CH-SO_3Na$

(12) $C_{17}H_{35}-\overset{O}{\underset{\|}{C}}-NH-\underset{\underset{H_3C\;\;CH_3}{\diagup\;\diagdown}}{C}-CH_2-NH-OC-CH_2-SO_3NH_4$

(13) $C_5H_{11}-\overset{O}{\underset{\|}{C}}-NH-(C_2H_4-NH)_2-OC-CH_2-SO_3Na$

(14) $C_{15}H_{31}-\overset{O}{\underset{\|}{C}}-NH-C_2H_4-NH-OC-(CH_2)_3-\underset{\underset{CH_3}{|}}{CH}-SO_3K$

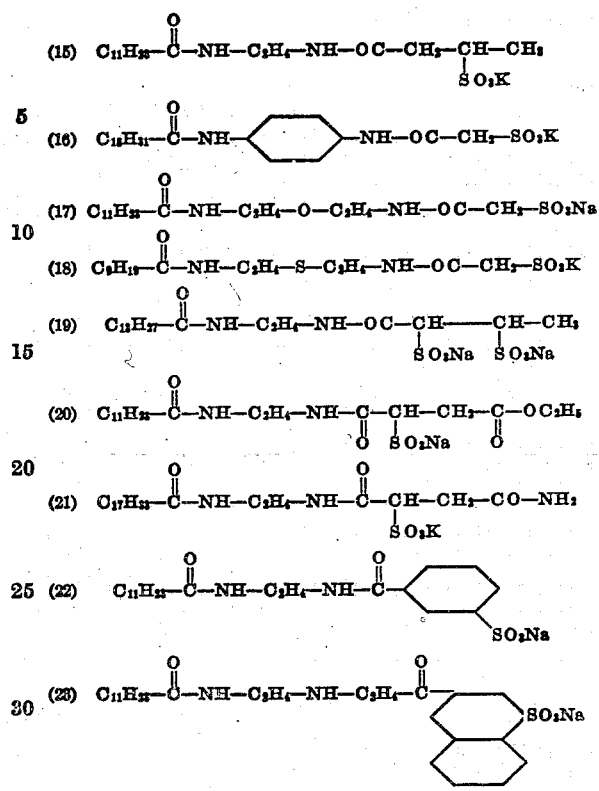

While the above examples represent single substances, it will be understood that in practice it is, in general, more advantageous to employ mixtures of any two or more thereof with or without diluents.

In general, the compounds are prepared by initially reacting a polyamine, for example, ethylene diamine ($H_2N-C_2H_4-NH_2$), with a higher molecular weight carboxylic acid or derivative thereof, such as halide, under conditions such as to insure a substantial yield of amide. The resulting amide is then reacted with preferably a lower molecular weight halogeno-carboxylic acid or halide or other derivative thereof to produce the halogen-containing ester, and then with an alkali sulphite, for example, sodium, potassium, ammonium, or lithium sulphite, to introduce a sulphonic group into the molecule. It will be clear, of course, that the order of the steps may be reversed if desired; that is, the reaction with the higher molecular weight acid or derivative thereof may be carried out last, or the two amidification steps may be carried out in optional order and the reaction with the alkali sulphite may be carried out thereafter.

The following examples are illustrative of methods which have been found suitable for preparing various of the compounds which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

Example A (1) 140 grams of sodium sulphite were dissolved in 400 cc. of water and there were added slowly thereto 122 grams of ethyl chloracetate $$\left(C_2H_5-O-\underset{\underset{O}{\|}}{C}-CH_2Cl\right)$$

The mixture was stirred continuously for 1½ hours during which time the temperature spontaneously rose from 37 degrees C. to 60 degrees C.

(2). To 66.2 grams of the solution produced in accordance with part (1) hereof, 8.6 grams of ethylene diamine were slowly added and the mass was then heated to the boiling point.

(3). The reaction product of part (2) hereof was dried and then suspended in 25 cc. of pyridine. To this suspension there were slowly added, with cooling to about 10 degrees C., 21 grams of lauroyl chloride. The mixture was then warmed to 35–40 degrees C. and then the excess pyridine was washed out with petroleum ether.

(4). If desired, the product may be purified by extraction with several volumes of hot isopropyl alcohol and then crystallized from said alcohol solution by cooling. The product, which had good foaming, wetting, and similar properties adapting it for various of the uses hereinafter described, consisted substantially of a product having the formula

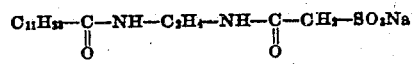

Example B 66.2 grams of a solution made as described in part (1) of Example A hereinabove were mixed with 30 grams of the lauric acid amide of diethylene triamine $$\left(C_{11}H_{23}-\underset{\underset{O}{\|}}{C}-NH-C_2H_4-NH-C_2H_4-NH_2\right)$$

and the mass was then stirred for three hours on the boiling water bath. The reaction product, which had good foaming and wetting properties, contained a substantial proportion of the product having the graphic formula

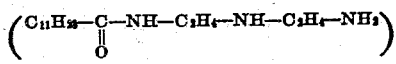

Example C (1). To 30 grams of the lauric acid amide of diethylene triamine there were added 11.3 grams of chloracetyl chloride and the mass was then warmed slowly on the water bath for ½ hour with continuous stirring.

(2). To the product resulting from part (1) hereof there were added 14 grams of sodium sulphite dissolved in 40 cc. of water and the entire mass was stirred on the boiling water bath for two to three hours.

If desired the product may be purified by crystallization from isopropyl alcohol. The product contained a substantial proportion of the same chemical compound illustrated graphically in Example B.

Example D (1). 350 grams of monostearin and 300 grams of triethylene tetramine were heated for three to four hours at 220 degrees C. The displaced glycerin and the excess triethylene tetramine were then washed out with water and the product was dried.

(2). To the product resulting from part (1) hereof, there were added slowly, with stirring, 113 grams of chloracetyl chloride and then the mixture was heated for ½ hour at 60–70 degrees C.

(3). 230 grams of the reaction mass of part (2) hereof were mixed with 200 cc. of water and 75 grams of sodium sulphite and the resulting mixture was heated for three to four hours on a boiling water bath with continuous stirring. The reaction product, which may, if desired, be used without further purification for various of the purposes hereinafter enumerated, contained a substantial proportion of a chemical compound having the graphic formula

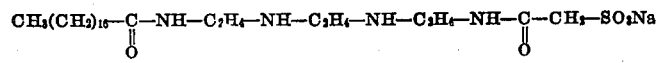

The acyl radical represented by R—CO in the general formulae may, as stated, be derived from various sources. Among such sources may be mentioned straight chain and branched chain carboxylic, aliphatic, and fatty acids or derivatives thereof such as halides, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

The halogeno-carboxylic acids or other derivatives thereof, preferably in the form of their esters with ethyl alcohol or the like, which are reacted with the primary and secondary alcohol amines, including polyamines, may be selected from a relatively large class including mono-, di- and poly-carboxylic derivatives as, for example, mono-chloracetic acid, mono-bromacetic acid, chloracetyl chloride, bromacetyl bromide, mono iodoacetic acid, alpha-chlor propionic acid, alpha-chlor butyric acid, alpha-bromo capric acid, mono-chlor succinyl chloride, di-chlor succinyl chloride, mono-chlor succinic acid, di-chlor succinic acid, di-chlor glutaryl chloride, nitrochloro-benzoyl chlorides and the like. Of particular utility are ethyl chloracetate and ethyl bromacetate.

The polyamines which are employed in the reactions may be selected from a large group, particularly the alkylene polyamines and polyalkylene polyamines and the alkyl and aralkyl derivatives as, for example, ethylene diamine, piperazine, diethylene triamine, triethylene tetra-amine, mono-methyl ethylene diamine, mono-ethyl diethylene triamine, beta-dimethyl-aminoethyl amine, and the like.

In the event that the sulphonic compounds of the present invention are made by reacting the halogen derivatives with an alkali sulphite or other soluble sulphites as well as thiosulphates, the corresponding alkali sulphonic acid derivative is produced. When prepared by other methods, other sulphonic acid salts may be produced, or the alkali sulphonates can be converted into other salts by methods such as described in the application of Benjamin R. Harris, Serial No. 190,136, filed February 11, 1938. Thus, the cation represented by M in the general formulae set forth hereinabove may be calcium, magnesium, aluminum, zinc, organic nitrogenous bases as, for example, alcohol amines and alkylol-, arylol- and aralkylol amines including mono-, di- and triethanolamine and mixtures thereof such as are, for example, present in so-called commercial triethanolamine, propanolamines, butanolamines, pentanolamines, hexanolamines, glycerolamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl monoethanolamine, diethyl-mono-ethanolamine, 1-amino-2, 3 propanediol, 1,2-diaminopropanol; alkylamines such as butyl amine, hexylamine, dimethylamine, ethylene diamine, diethylene triamine, triethylene tetra-amine, mono-methyl ethylene diamine, mono-ethyl diethylene tetra-amine, mono-allyl amine, aromatic and heterocyclic bases such as benzylamine, cyclo-hexylethyl-aniline, morpholine, pyridine, alkyl pyridines such as methylpyridine, piperidine, pyrrolidines, quinoline, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

The compounds of this invention have utility in various arts in which interface modifying agents are employed. They are resistant to precipitation by calcium and magnesium salts and are compatible with acid and alkali media. They may be utilized in washing and laundering and in the textile and related industries wherein they function for softening, wetting, detergent, emulsifying, penetrating, dispersing, frothing, and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulphoacetate, and the like sulphuric and sulphonic derivatives of condensation products of alkylolamines and higher fatty acids; phosphoric, pyrophosphoric and tetraphosphoric acid esters of higher molecular weight alcohols; Turkey-Red oils; compounds of the type of isopropyl naphthalene sodium sulphonate, and other classes of wetting agents.

It will be understood that, in all cases, there is present in the molecules of the sulphonic derivatives of the present invention at least one sulphonic acid radical although, depending upon the particular reacting ingredients and the proportions thereof utilized, more than one sulphonic group may be introduced.

Wherever the term "higher" is employed as referring to higher molecular weight organic acids or the like, it will be understood to cover at least six carbon atoms unless otherwise specifically stated.

Whenever the term sulphonic group, sulphonic acid group, sulphonic radical or the like expression is employed in the claims, it will be understood to cover the compounds irrespective of whether the hydrogen of the sulphonic acid radical is present as such or replaced by another cation, unless the connotation otherwise expressly indicates differently.

What we claim as new and desire to protect by Letters Patent of the United States is:

1. Chemical compounds corresponding to the general formula

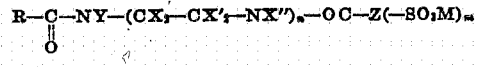

wherein

is an acyl radical containing at least six carbon atoms, Y, X, X' and X'' are members selected from the group consisting of hydrogen, alkyl, cycloalkyl, and alkylol, Z is a hydrocarbon residue, M is a cation, and n and m are whole numbers.

2. Chemical compounds corresponding to the general formula

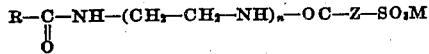

wherein

is an acyl radical containing from eight to eighteen carbon atoms, Z is a hydrocarbon radical containing from one to four carbon atoms, M is a cation, and n is a number ranging from one to three.

3. Chemical compounds corresponding to the general formula

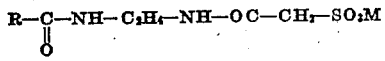

wherein

is an acyl radical containing from eight to eighteen carbon atoms, and M is a cation.

4. Chemical compounds corresponding to the general formula

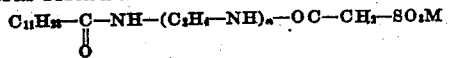

wherein $n$ is a whole number and M is a cation.

5. Chemical compounds corresponding to the general formula

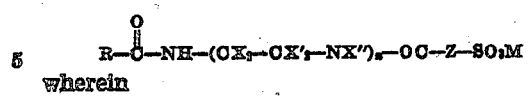

wherein

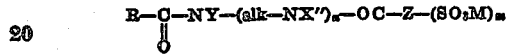

is an acyl radical containing at least six carbon atoms, X, X' and X" are members selected from the group consisting of hydrogen, alkyl, cycloalkyl and alkylol, Z is a hydrocarbon residue containing not more than six carbon atoms, M is an organic nitrogenous base cation, and $n$ is a whole number.

6. Chemical compounds corresponding to the general formula

R—C—NY—(alk—NX")$_n$—OC—Z—(SO$_3$M)$_m$
$\phantom{R—C—}\|$
$\phantom{R—C}$O wherein

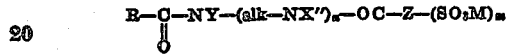

is an acyl radical containing at least six carbon atoms, Y and X" are members selected from the group consisting of hydrogen, alkyl, cycloalkyl, and alkylol, alk is a hydrocarbon residue, Z is a hydrocarbon residue containing not more than six carbon atoms, M is a cation, and $n$ and $m$ are whole numbers.

7. Chemical compounds corresponding to the general formula

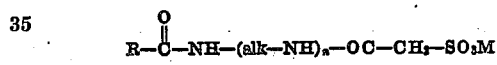

wherein

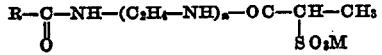

is an aliphatic acyl radical containing from eight to eighteen carbon atoms, alk is an aliphatic hydrocarbon residue, M is a cation, and $n$ is a whole number.

8. Chemical compounds corresponding to the general formula

R—C—NH—(C$_2$H$_4$—NH)$_n$—OC—CH—CH$_3$
$\phantom{R—}\|\phantom{—NH—(C_2H_4—NH)_n—OC—CH—}\|$
$\phantom{R—}$O$\phantom{—NH—(C_2H_4—NH)_n—OC—CH—}$SO$_3$M wherein

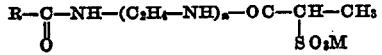

is a fatty acid acyl radical containing from eight to eighteen carbon atoms, M is a cation, and $n$ is a whole number.

9. Chemical compounds corresponding to the general formula

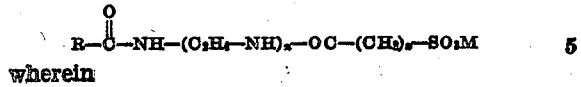

wherein

is a fatty acid acyl radical containing from eight to eighteen carbon atoms, M is a cation, and $n$ and $x$ are whole numbers ranging from one to four.

10. Chemical compounds corresponding to the general formula

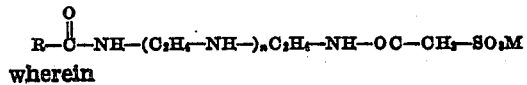

wherein

is an acyl radical containing from eight to eighteen carbon atoms, M is a cation, and $n$ is zero or a whole number.

11. A method of preparing chemical compounds which comprises reacting, in optional order, a polyamine with a member selected from the group consisting of higher molecular weight carboxylic acids and derivatives thereof containing at least six carbon atoms to produce a substantial yield of an amide of said polyamine, then reacting the resulting amide with a member selected from the group consisting of halogeno-carboxylic acids and halides thereof, followed by reacting the resulting product with an alkali sulphite.

12. The method of claim 11 wherein the polyamine falls within the scope of the formula H$_2$N—(CX$_2$—CX'$_2$—NH—)$_n$CX"$_2$—CX"'$_2$—NH$_2$ wherein X, X', X" and X"' are members selected from the group consisting of hydrogen, alkyl, cycloalkyl, and alkylol, and $n$ is zero or a whole number.

13. The method of claim 11 wherein the polyamine falls within the scope of the following formula H$_2$N—(C$_2$H$_4$—NH—)$_n$C$_2$H$_4$—NH$_2$ wherein $n$ is zero or a whole number, and the halogeno-carboxylic acid and halides thereof are selected from the group consisting of chloracetic acid, chloracetyl chloride, bromacetic acid, and bromacetyl bromide.

ALBERT K. EPSTEIN.
MORRIS KATZMAN.